United States Patent [19]

Hammonds et al.

[11] 4,407,617
[45] Oct. 4, 1983

[54] COMBINATION MANUAL AND AUTOMATIC UNLOCKING MECHANISM FOR TRAILER HITCH HEAD

[75] Inventors: James C. Hammonds, St. Charles; Ronald D. VanDyke, St. Peters, both of Mo.

[73] Assignee: ACF Industries, Incorporated, New York, N.Y.

[21] Appl. No.: 295,154

[22] Filed: Aug. 21, 1981

[51] Int. Cl.³ .......................... B60P 3/06; B62D 53/08
[52] U.S. Cl. ........................................ 410/59; 410/64; 280/435
[58] Field of Search .................. 410/56, 58, 59, 60, 410/61, 62, 63, 64, 65, 66, 67, 57; 280/434, 435, 436, 432, 433; 403/321, 322, 326, 327; 292/DIG. 62, 45, 48, 26

[56] References Cited

U.S. PATENT DOCUMENTS 3,225,707 12/1965 Rollins et al. .................... 410/62
3,497,169 2/1970 Enochian ......................... 410/60
4,239,429 12/1980 Stoller et al. .................... 410/64

*Primary Examiner*—Robert B. Reeves
*Assistant Examiner*—Richard Mathieu
*Attorney, Agent, or Firm*—Henry W. Cummings

[57] ABSTRACT

In accordance with the present invention a lock block link 34 has a first end 36 connected to a trailer hitch bumper block 22 and a second end 40 which engages a lock block 46 which holds the hitch jaws 16 in closed position. The lock block link 34 is supported by an operating shaft link 54 extending from a manual operating shaft 50 extending to the side of the hitch. When the bumper block 22 is engaged by a tractor, the bumper block rotates about pins 30 connecting the bumper block to the hitch head 10. This rotation moves the lock block link 34 and in turn the lock block 46 rearwardly, which allows the jaws 16 to rotate to open position to allow exit of the trailer king pin. A lost motion connection 31 is provided in the connection between the first end of the lock block link and the bumper block to allow the lock block link 34 to move relative to the bumper block when the lock block 46 is moved rearwardly manually by the operating shaft. This connection may comprise at least one elongated slot 32 in the bumper block into which fits the first end of the lock block link.

12 Claims, 22 Drawing Figures

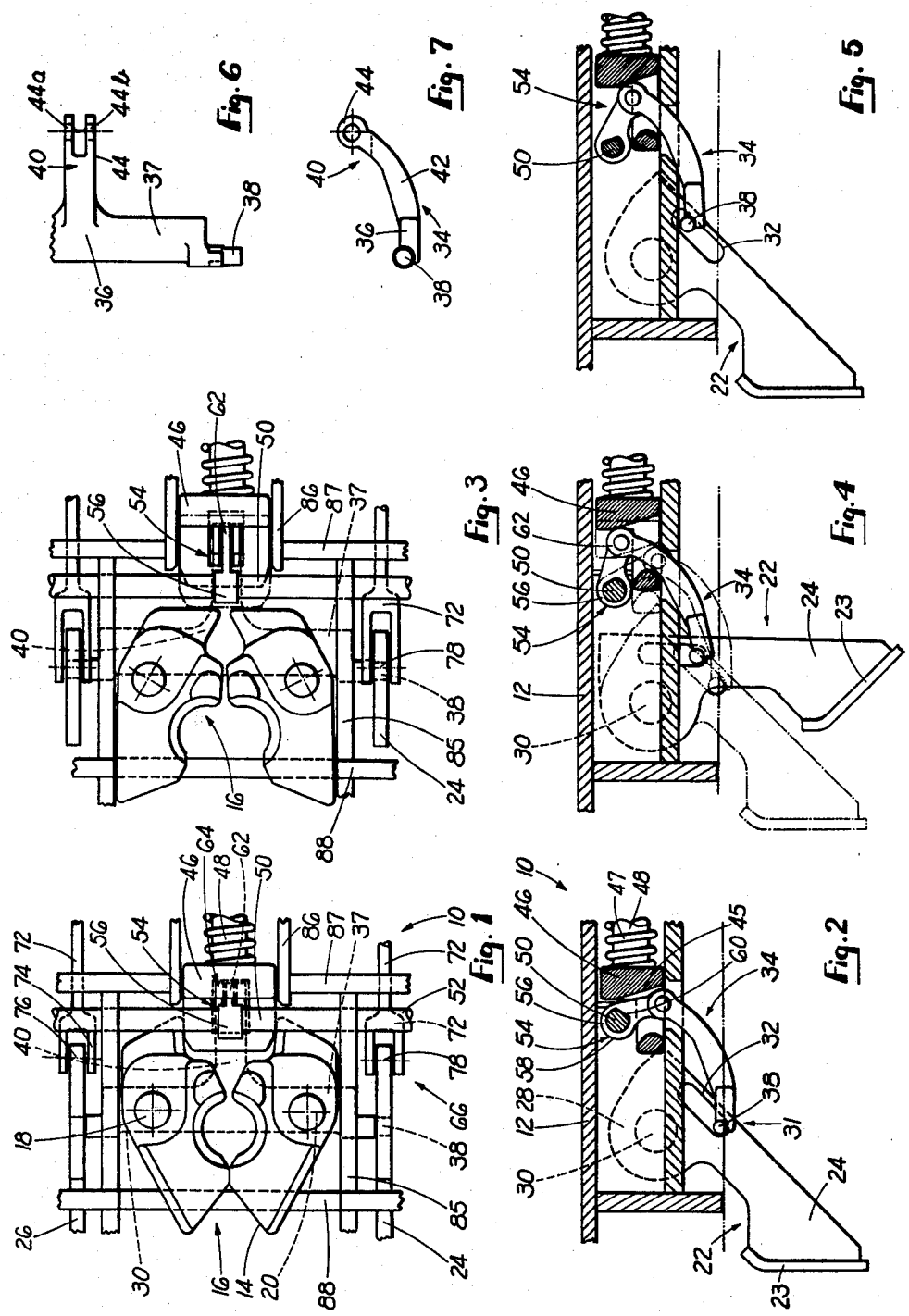

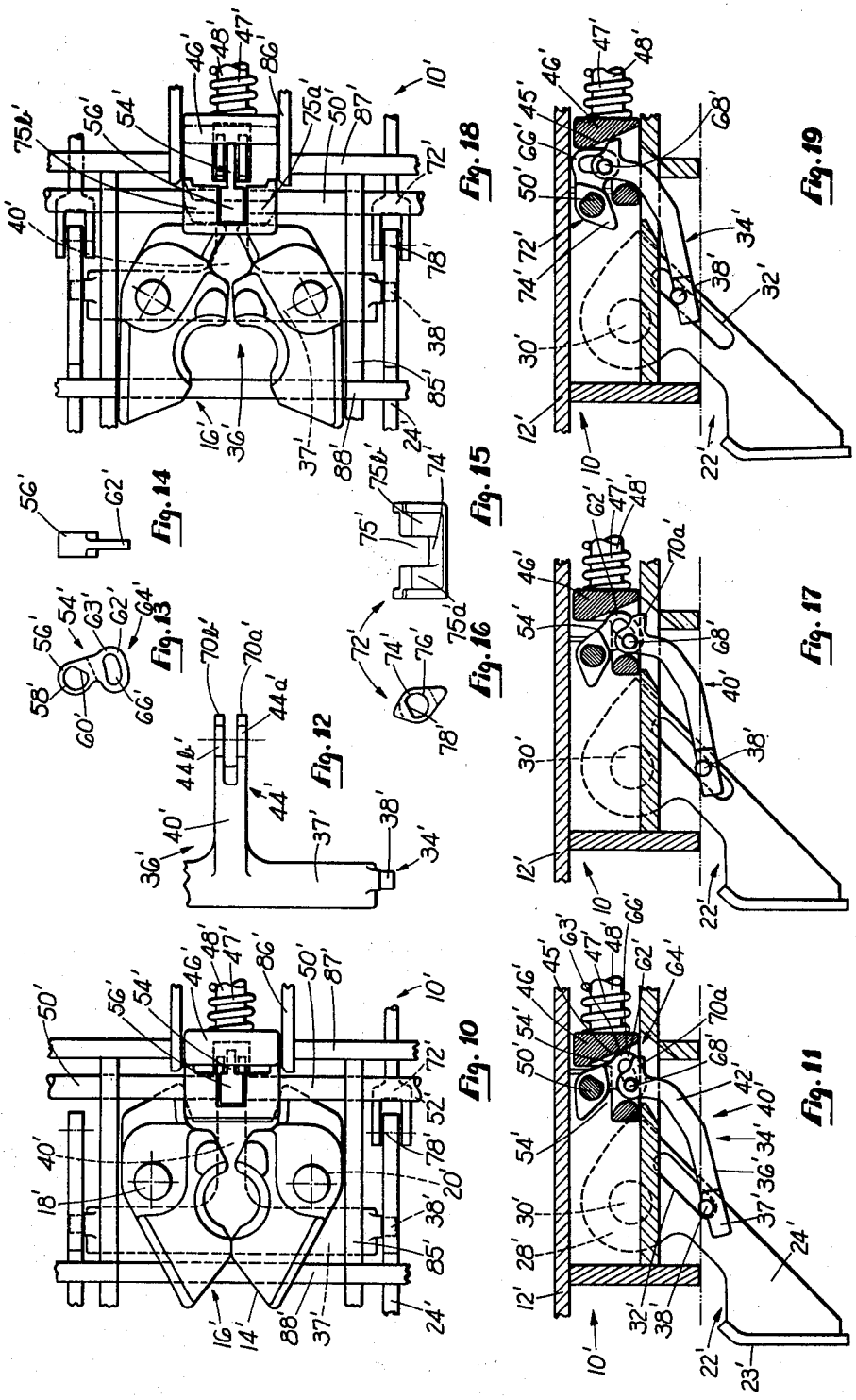

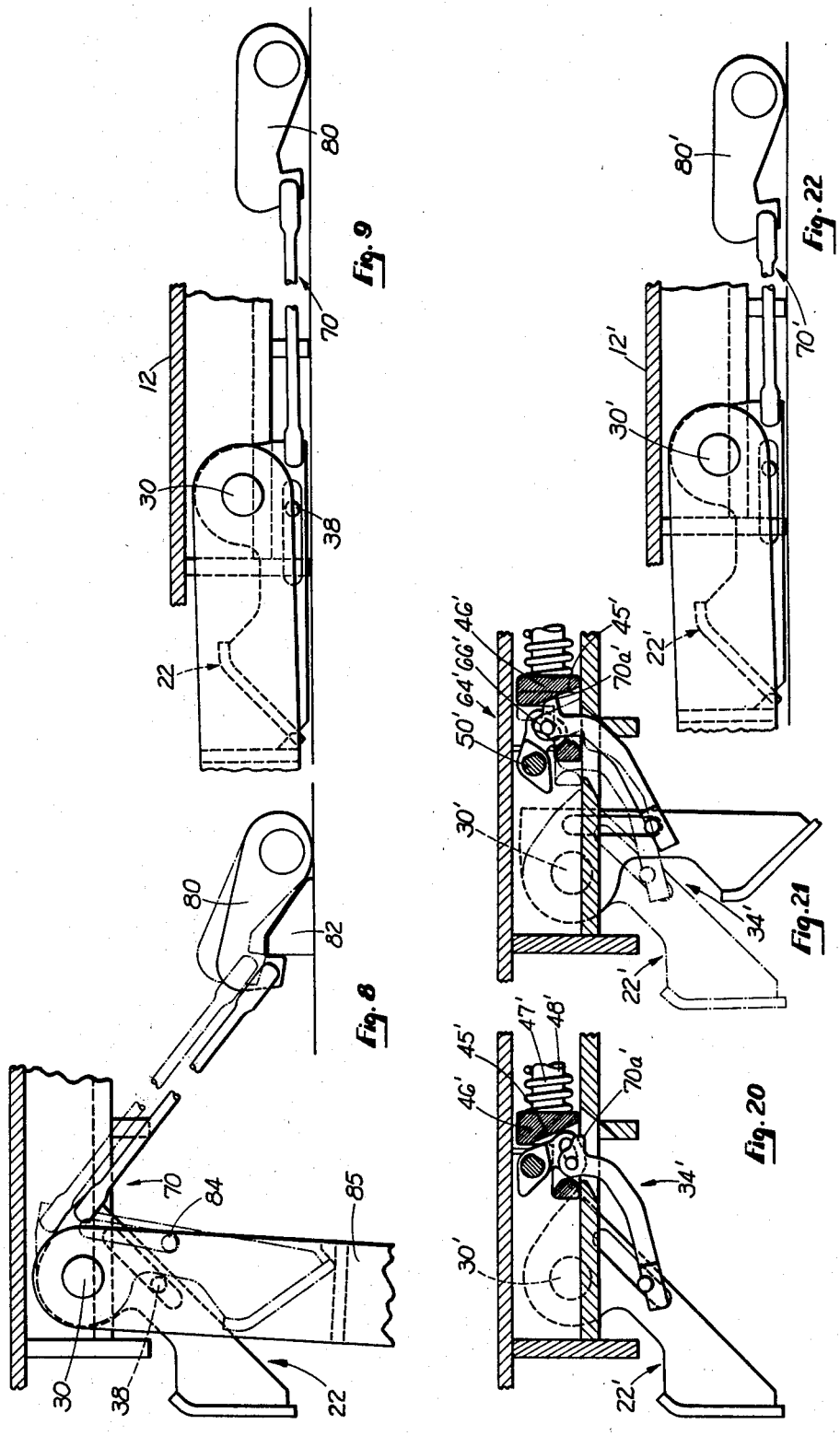

COMBINATION MANUAL AND AUTOMATIC UNLOCKING MECHANISM FOR TRAILER HITCH HEAD

BACKGROUND OF THE INVENTION

As is disclosed in U.S. Pat. No. 4,213,590 granted July 22, 1980, a trailer hitch head includes a pair of movable jaws to hold in place a king pin of a highway trailer. The jaws are held in closed position by a lock block which is biased to closed position by a stiff spring. The lock block is movable manually to open position by an operating shaft extending to a side of the hitch which can be actuated to move the lock block rearwardly against the bias of the spring to hold it there by means of overcenter geometry, to allow the jaws to pivot to open position under the action of the king pin. This pivoting action then trips the geometry back overcenter so the jaws are ready to resecure the next king pin. This hitch is not retractable. The king pin securement can only be manually actuated.

In U.S. Pat. No. 4,230,431, a trailer hitch is disclosed including a vertical strut and a diagonal strut. The hitch is automatically movable to a retracted position on the deck of a transportation vehicle when a tractor engages a bumper block which is connected to a linkage in the diagonal strut which disengages at least one movable lug from engagement with a fixed lug on the deck to allow the hitch to assume a retracted position.

In this construction the diagonal strut includes a transverse bar adjacent the hitch head which strikes a pivoted finger on the head to move a lock block rearwardly to allow the jaws to move to open position.

In this construction the need for manually moving the lock block to open position and holding it there was accomplished by a secondary mechanism which had to be simultaneously engaged while rotating the operating shaft.

For manual operation, the shaft could not be extended to the side of the hitch to form a handle because in retracted position the shaft would interfere with the diagonal strut and require the operator to furnish a handle. Therefore in U.S. Pat. No. 4,333,666 issued June 8, 1982, the shaft was moved up higher in the hitch head to avoid interference with the diagonal strut, and was extended to the side of the head and formed into a handle for manual operation. This necessitated changing the direction of rotation of the operating shaft to move the lock block back. This design was for manual operation only.

However, some customers have desired a hitch of this later type in which when the bumper bar is engaged by the tractor to move the hitch to retracted position, the jaws would automatically be allowed to open.

Some customers also have a desire for a hitch capable of both manual and automatic operation.

SUMMARY OF THE INVENTION

The object of the present invention is to provide a tractor operated hitch wherein the jaws are allowed to open automatically when the bumper bar is engaged by the tractor and wherein the jaws can also be opened manually by an operating shaft located sufficiently high in the hitch head whereby the shaft will not interfere with the diagonal strut when the hitch assumes a retracted position.

In accordance with the present invention a lock block link has a first end connected to the bumper block and a second end which engages a lock block which holds the hitch jaws in closed position. The lock block link is supported by an operating shaft link extending from an operating shaft extending to the side of the hitch for manual operation. When the bumper block is engaged by the tractor, the bumper block rotates about pins connecting the bumper block to the hitch head. This rotation moves the lock block link and the lock block rearwardly which allows the jaws to rotate to open position to allow exit of the trailer king pin. The lock block moves rearwardly of the hitch when the operating shaft link is moved rearwardly by the operating shaft to open the jaws manually. Lost motion means are provided to allow the lock block link to move relative to the bumper block when the lock block is moved rearwardly manually by the operating shaft and the operating shaft link. In one embodiment, while the lock block is manually held in retracted position, the king pin and trailer may be removed by another attendant with an overhead crane.

In another embodiment, the operating shaft link assumes an overcenter position holding the lock block in open position, and an operating shaft link cam means 72' is engagable by the jaws whereby as the jaws are pivoted to open position the jaws engage the operating shaft cam means and move the operating shaft link from its overcenter engaged position with the lock block. Lost motion connecting means 64' is provided between the lock block link 34' and the operating shaft link 54' whereby the operating shaft link may be moved relative to the lock block link when the jaws engage the cam during bumper block operation.

IN THE DRAWINGS

FIG. 1 is a plan view of the hitch head of the present invention with a lock block holding the jaws in closed position.

FIG. 2 is a vertical sectional view of FIG. 1.

FIG. 3 is a plan view of the hitch head of the present invention with the jaws open and the lock block engaging the rear portion of the jaws, holding them in open position.

FIG. 4 is a vertical sectional view illustrating bumper block operation.

FIG. 5 is a view similar to FIG. 4 illustrating manual operation by rotation of shaft 50.

FIG. 6 is a detail view of the lock block link used in the present invention.

FIG. 7 is a side elevation view of FIG. 6.

FIG. 8 is a side elevation view illustating retraction of the hitch by the bumper block.

FIG. 9 is a view of the hitch in retracted position.

FIG. 10 is a plan view of another embodiment of the invention with the lock block located between the jaws, holding them in closed position.

FIG. 11 is a vertical sectional view of FIG. 10.

FIG. 12 is a detail view of the lock block link.

FIG. 13 is a detail view of the operating shaft link of this embodiment.

FIG. 14 is a side elevation view of FIG. 13.

FIG. 15 is a view of the operating shaft link cam means.

FIG. 16 is a side elevation view of FIG. 15.

FIG. 17 is a view of the hitch head illustrating initial movement of the lock block link during manual operation.

FIG. 18 is a plan view illustrating the lock block engaging the rear portion of the jaws and holding the jaws in open position.

FIG. 19 is a view of the operating shaft link in over-center position.

FIG. 20 is a view of the hitch head prior to bumper block operation.

FIG. 21 is a view similar to FIG. 20 illustrating bumper block operation.

FIG. 22 is a view of the hitch after bumper block operation has retracted the hitch.

DESCRIPTION OF PREFERRED EMBODIMENTS

In the drawings a hitch head 10 is provided with a top plate 12 having a gathering slot 14 as is conventional. Locking jaws 16 are pivotally mounted about jaw pins 18. A jaw pin clip 20 holds the jaw pins in place.

A bumper block 22 includes a bumper portion 23 and a pair of arms 24 and 26 each of which includes an enlarged end 28 which receives a pin 30 to pivotally mount the bumper block about the hitch head. This much is conventional. See U.S. Pat. No. 4,225,276 incorporated herein by this reference.

Each of the enlarged ends 28 includes an elongated slot 32 located below and slightly rearwardly in from the pivot pin 30. Each of the slots 32 receives a lock block link indicated generally at 34. Lock block link includes a first end 36 having a laterally extending portion 37 and outer end portions 38 which move within slots 32. At about the midportion of the first end 36, a second portion 40 extends outwardly therefrom. Second portion 40 is arcuate as indicated at 42 and includes an outer end 44. Outer end 44 is located adjacent inclined lock block surface 45. Lock block 46 is biased by a stiff spring 47 surrounding a spring shaft 48 into an engaging position with the jaws 16 as is described in greater detail in U.S. Pat. No. 4,213,590 incorporated herein by this reference. An operating shaft 50 extends to at least one side of the hitch and includes a handle or non-round end 52 adapted to receive a suitable tool to rotate the shaft. In the midportion of the hitch generally above the link 34, is located an operating shaft link 54. Operating shaft link 54 includes a first end 56 having an opening 58 through which extends the shaft 50. A flat side 60 of the opening 58 insures that the link will rotate with the shaft 50. Link 54 includes a second end 62 which extends between opposite ends of the bifurcated portion 44a and 44b of the lock block link 34. A pin 64 holds these members in engagement. Thus the outer end 44 of lock block link 34 is supported by operating shaft link 54.

It is thus possible to open the jaws manually. When a handle or suitable tool is utilized to rotate the shaft 50 in a counterclockwise direction, the link 54 is rotated rearwardly and moves the lock block 46 rearwardly. While this occurs, the bumper block 22 and arms 24 and 26 are stationary. The ends 38 of the lock block link 34 simply move along the slots 32 to the upper inboard end thereof. When this occurs the lock block link moves from the position shown in solid lines in FIG. 2 to the position shown in solid lines in FIG. 5. The operating shaft link 54 and lock block 46 will remain in this position so long as link 54 is held in this position manually by shaft 50. The king pin and trailer can then be removed by another attendant operating an overhead crane. The jaws may be moved to closed position (FIG. 1) for maintenance including lubrication and inspection for wear at which time the above procedure may be used to reopen them.

The enlarged ends 28 of the arms 24 and 26 include means 66 for connecting the enlarged ends to a diagonal strut linkage. Thus a diagonal strut linkage indicated generally at 70 includes a pair of bifurcated arms 72 having openings 74 which receive a pin 76 which also extends through an opening 78 in the enlarged end 28 of the arms 24 and 26.

It will be apparent that engagement of a tractor with the bumper portion 23 will pivot the bumper block 22 and arms 24 and 26 counterclockwise about the pin 30 from the position shown in FIGS. 1 and 2 moving link 34 rearwardly and moving lock block 46 rearwardly to the position shown in FIG. 4. Then, jaws 16 may be pivoted to open position through the action of the tractor acting on the bumper block and the king pin to allow the king pin to exit from the jaws. Simultaneously, the hitch is retracted as described in U.S. Pat. No. 4,225,276, wherein when the bumper block 22 is engaged by a tractor, the arms 24 and 26 and enlarged ends 28 pivot in a counterclockwise direction. Thus not only is link 34 moved rearwardly and lock block 46 moved rearwardly to allow the jaws 16 to pivot to the open position, but also the diagonal strut linkage 70 is moved upwardly. When this occurs a movable lug 80 (FIG. 8) is moved out of engagement with a fixed lug 82. This allows the hitch to assume a retracted position on the deck shown in phantom lines in FIG. 9. As the hitch is retracted, spring 47 urges the lock block into engagement with the rear of the jaws (shown in dotted lines in FIG. 3) and bumper block 22 engages a stop 84 on the vertical strut 85. As the strut is rotated downwardly the bumper block assumes a horizontal position shown in dotted lines in FIG. 9. When the hitch is erected, the lock block remains in engagement with the rear of the jaws awaiting a new king pin to move the jaws to closed position as shown in solid lines in FIG. 3.

This construction is satisfactory for unloading of the trailer by tractors which simultaneously retract the hitch.

However, for unloading applications where the hitch remains erect and the trailer is removed by opening the jaws manually with a handle tool or connected to the operating shaft, the attendant must hold the jaws open while the trailer is removed. This provides a possible safety hazard in that overhead crane equipment and/or the trailer could hit the attendant if he assumes a standing position during removal of the king pin.

Furthermore, the attendant must hold the jaws open for removal of each trailer as it is unloaded. It would be more convenient, more efficient and safer if the attendant could place a series of jaws into unlocked position and witness removal of the trailers from a safe distance, or attend to other duties. To meet this need the embodiment in FIGS. 10-15 may be utilized. In this embodiment a hitch head 10' is provided with a conventional top plate 12'. Top plate 12' is similar to FIGS. 1 and 2 including a gathering slot 14'. Also as in FIG. 2 locking jaws 16' are pivotally mounted about jaw pins 18. A jaw pin clip 20 holds the jaw pins in place.

A bumper block 22' includes a bumper portion 23 similar to FIG. 1, and a pair of arms 24' extending outwardly therefrom, each of which includes an enlarged end 28' which receives a pin 30' to pivotally mount the bumper block 22' about the hitch head.

Each of the enlarged ends 28' includes an elongated slot 32' located below and slightly rearwardly in from the pivot pin 30'. Each of the slots 32' receives a lock block link 34'. As described in FIGS. 1-7, a lock block link includes a first end 36' having a laterally extending portion 37' and outer end portions 38' which move within slots 32. At about the midportion of the first end 36, a second portion 40' extends outwardly therefrom. Second portion 40' is arcuate as indicated at 42' and includes a bifurcated outer end 44'. Outer end 44' is located adjacent inclined lock block surface 45'. As in FIGS. 1-6, lock block 46' is biased by a stiff spring 47' surrounding a spring shaft 48' into an engaged position with the jaws 16.

An operating shaft 50' extends to at least one side of the hitch and as in FIGS. 1-6 includes a non-round end 52' adapted to receive a suitable tool or handle to rotate the shaft. In the midportion of the hitch generally above the link 34' is located an operating shaft link 54'. Operating shaft link 54' includes a first end 56' having an opening 58' through which extends the shaft 50'. A flat side 60' of the opening 58' insures that the link will rotate with the shaft 50. Link 54' includes a second end 62' which extends between opposite ends of the bifurcated portion 44a' and 44b' of the lock block link 34. (FIGS. 13 and 14).

In accordance with this embodiment of the invention, lost motion connecting means 64' are provided between the lock block link 34' and the operating shaft link 54'. This lost motion connecting means preferably comprises a slot 66' located in the second end 62' of the operating shaft link. A pin 68' holds the second end 62' in place between the bifurcated end portions 44a and 44b of the link 34'.

In addition, in this embodiment, bifurcated end portions 44a' and 44b' contain projections or protrusions 70a' and 70b'. These projections or protrusions 70a' and 70b' extend inwardly toward lock block surface 45'.

In addition, operating shaft link cam means indicated (FIGS. 15 and 16) generally at 72' includes a body portion 74' having a slot 75' which divides the cam into two portions 75a' and 75b'. Each contains a slot 76' having a flat side 78' which assumes rotation with shaft 50'. Shaft 50' passes through both bifurcated portions 75a' and 75b'. Cam body portion 74' is adapted to be engaged by the jaws as they pivot to open position as will be described further hereinafter.

In the operation of this embodiment when a suitable tool or handle is utilized to rotate the shaft 50' in a counterclockwise direction operating shaft link 54' is also rotated in this direction. Surface 63' of second end 62' immediately engages surface 45' of the lock block and begins to move the lock block rearwardly. Since lock block link pin 68' is already located in the lower bottom portion of slot 66' rotation of operating shaft link 54' also moves link 34' toward the lock block and the first end 38' moves through the lost motion connecting means slots 32'. See FIG. 17. Continued rotation of the operating shaft 50' causes the portion 62' to move the lock block back sufficiently far that link 54' assumes an overcenter position relative to shaft 50'. Thus as shown in FIG. 18, operating shaft link 54' has rotated sufficiently far to achieve this overcenter position. Rotation of at least about 60° is believed to be necessary, preferably at least 75°. Note that the first end 38' has moved significantly upward within the slots 32' in the bumper block 22. The lock block 46' remains in the open position shown in FIG. 18 until the operating shaft link means 54' is moved from this overcenter position.

It will be noted that operating shaft link cam means 72' has been rotated also from the position shown in FIG. 7 to the position shown in FIG. 18 wherein the cam body portion 74' is extending outwardly and downwardly toward the jaws. When the king pin pivots the jaws to open position as the king pin exits the jaws engage the cam body portion 74'. This causes the operating shaft link 54' to rotate clockwise and pivot the operating shaft link means from the overcenter position shown in FIG. 18.

After the jaws engage the operating shaft cam means 72' and pivot the operating shaft link 54' clockwise and move the operating shaft link from an overcenter position engaging the lock block 46, the lock block spring 47' moves the operating shaft link 54' and the lock block link 34' to the position shown in FIG. 19. In this position, the lock block engages the rear of the jaws and holds the jaws in open position (FIG. 18) awaiting another king pin to enter the hitch head. When a new king pin enters, king pin engages the jaws and moves the jaws back sufficiently far that the lock block slides between them and moves the jaws to the position shown in FIG. 10.

FIG. 20 illustrates operation of the hitch head when a tractor engages the bumper block 22'. This pivots the bumper block about the pin 30'. This is turn moves the lock block link 34' rearwardly and lugs 70a' and 70b' engage the lock block 46' along the surface 45' and move the lock block rearwardly. Since the operating shaft 50' has not been actuated, the operating shaft link 54' tends to remain stationary, and does not normally engage the lock block. Projections 70a' and 70b' are provided for this purpose. Operating shaft link connecting means 64' in this instance elongated slot 66', allows the link 34' and the pin 68' to move within this slot as the link 34' moves rearwardly and the lock block moves rearwardly (FIG. 21). However, it is possible that friction between the pin 68' and the surfaces defining the slot 66' will cause the operating shaft link 54' to pivot somewhat counterclockwise, even to the extent assuming an overcenter position similar to FIG. 18. In this event, the king pin engages the jaws during exit and pivots the same, the jaws engage the cam portion 74' and pivots the operating shaft link about the shaft 50'. The lost motion connecting means 64' permit such rotation of the operating shaft link 54' relative to the lock block link 34' and lock block link pin 68'.

As mentioned above, when the bumper block is actuated, not only do the jaws open but also the hitch is retracted as described in regard to the embodiment shown in FIGS. 1-9. FIG. 20 shows the retracted position of the hitch head. Bumper block 22' extends generally horizontally along the deck. The lock block 46' is engaging (FIG. 18) the rear portion of the jaws holding them in open position awaiting the entrance of a new king pin. Lock block link pin 68' has returned to its position in the lower portion of the slot 66'. When the hitch is moved by the tractor into an upright position, the hitch will assume the position shown in FIG. 17 with the lock block remaining in engagement with the rear portion of the jaws awaiting entrance of the next king pin.

The provision of the operating shaft link cam means 74' acting in concert with the lost motion connecting means 66', provides that even if an overcenter position of the operating shaft link 54' occurs during bumper block operation, similar to FIG. 13, that this overcenter position will be disengaged through the engagement of the jaws with the cam 74'. Slot 66' allows the operating shaft link to pivot relative to lock block link pin 38' in this event.

It is seen that in this embodiment it is not necessary for the attendant during manual operation to hold the operating shaft link 54' while the king pin is removed. Rather as shown in FIG. 13, rotation of the shaft 50' does move the operating shaft link 54' into an overcenter position. The link 54' will remain in this overcenter position until such time as the jaws engage cam surface 74' and pivot the link out of the overcenter position, or until such time as the operating shaft 50' is rotated in a clockwise direction which also will move the link from the overcenter position.

It is seen that this arrangement is safer and more convenient for the attendant. He can move a series of hitch head operating shaft link means to the overcenter position, then either he himself or another attendant can move the king pins and trailers out of the jaws. Moreover, he can leave the area and the danger is eliminated that either the trailer or the overhead crane equipment could strike the attendant during removal of the trailers as would be the case if he were holding the lock block in retracted position when the king pins are removed from the head.

What is claimed is:

1. A tractor operated trailer hitch jaw opening mechanism comprising: a lock block link having a first end connected to a bumper block and a second end adapted to engage a lock block which holds the hitch jaws in closed position; pivot means connecting the bumper block to the hitch head; whereby when said bumper block is engaged by the tractor said bumper block rotates about said pivot means; and whereby this rotation moves said lock block link and said lock block rearwardly, which allows said jaws to rotate to open position to allow exit of the trailer kingpin; and lost motion means to allow said lock block link to move relative to the bumper block when said lock block is moved rearwardly manually.

2. A mechanism according to claim 1, including an operating shaft and an operating shaft link extending from said shaft to the second end of the lock block link and engaging the same to move said lock block link and said lock block rearwardly of the hitch to unlock the jaws manually.

3. A mechanism according to claim 1, wherein said lost motion means comprises at least one elongated slot in the bumper block into which fits at least a portion of the first end of said lock block link.

4. A mechanism according to claim 3, wherein said bumper block is bifurcated and includes a pair of laterally spaced arms each of which includes an enlarged end to receive a pin to pivotally mount the bumper block about the hitch head, each of said arms including an elongated slot to receive a first end of the lock block link.

5. A mechanism according to claim 4, wherein the enlarged ends also include means for engaging a diagonal strut linkage to disconnect a movable lug from a fixed lug at the lower end of the hitch diagonal strut to allow the hitch to assume a retracted position when the bumper block is engaged by the tractor.

6. A mechanism according to claim 5, wherein the diagonal strut linkage means comprises pins extending through the enlarged ends which respectively engage a bifurcated upper end portion of the diagonal strut linkage.

7. A combination manual and automatic unlocking mechanism for trailer hitch head comprising: a lock block link having a first end engaging a trailer hitch bumper block, and a second end adapted to engage a lock block; pivot means connecting the bumper block to the hitch head; said lock block in one position holding hitch jaws in closed position; said lock block link being supported by an operating shaft link extending downwardly from a manual operating shaft located above said lock block link and extending to at least one side of the hitch; lost motion connecting means provided in the connection between the first end of the lock block link and the bumper block to allow the lock block link to move relative to the bumper block when the lock block is moved rearwardly manually by the operating shaft to allow exit of the king pin; and whereby when said bumper block is engaged by a tractor, said bumper bar rotates about said pivot means; said rotation moves lock block link and said lock block rearwardly, which allows the jaws to rotate to open position to allow exit of the trailer king pin.

8. A mechanism according to claim 7, wherein said lost motion connection means comprises at least one elongated slot in the bumper block into which fits the first end of the lock block link.

9. A mechanism according to claim 8, wherein resilient means engaging said lock block and biasing the lock block to engaged position with said jaws requires that the attendant hold the operating shaft link in engagement with the lock block to allow the king pin to exit and pivot the jaws into open position.

10. A mechanism according to claim 8, wherein said operating shaft link means assumes an overcenter position relative to said lock block after manual rotation of said operating shaft.

11. A mechanism according to claim 10, including operating shaft link cam means connected to said operating shaft engagable by the jaws whereby said jaws move the operating shaft link fom its overcenter engaged position with the lock block.

12. A mechanism according to claim 11, wherein lost motion connecting means is provided between the lock block link and the operating shaft link, whereby the operating shaft link may move relative to the lock block link during bumper block operation when the jaws engage said cam means as the king pin exits.

* * * * *